(No Model.)

O. PEDERSON.
CASTER.

No. 409,495. Patented Aug. 20, 1889.

WITNESSES
T. W. Fowler,
W. H. Patterson

INVENTOR
Ole Pederson,
A. H. Evans & Co
Attorneys

UNITED STATES PATENT OFFICE.

OLE PEDERSON, OF JOLIET, ILLINOIS.

CASTER.

SPECIFICATION forming part of Letters Patent No. 409,495, dated August 20, 1889.

Application filed November 20, 1888. Serial No. 291,347. (No model.)

*To all whom it may concern:*

Be it known that I, OLE PEDERSON, a citizen of the United States, residing at Joliet, in the county of Will and State of Illinois, have invented certain new and useful Improvements in Casters, of which the following is a full and clear description, reference being had to the accompanying drawings, forming part of this specification, in which—

Figure 1:
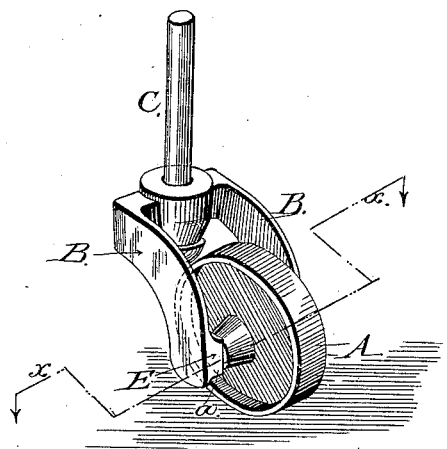
Figure 2:
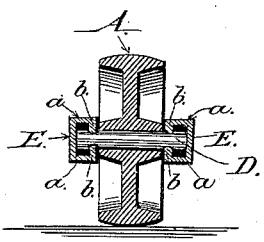
Figure 3:
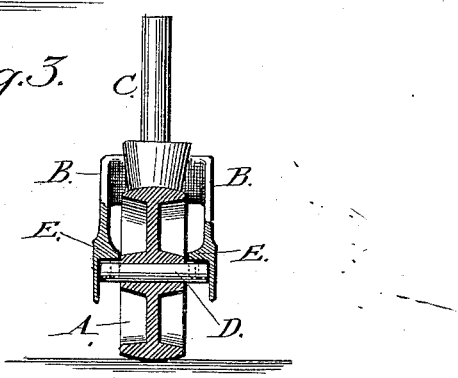
Figure 4:
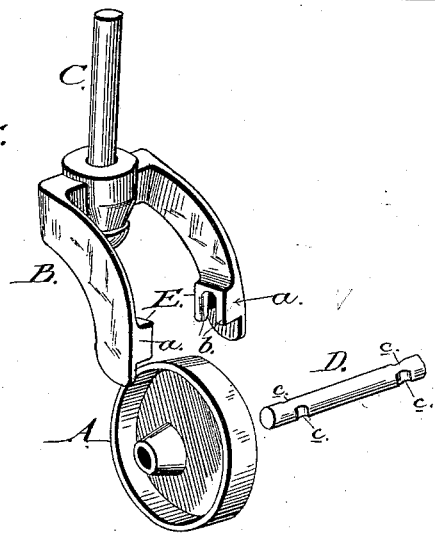

Figure 1 represents a perspective view of a caster embodying my invention. Fig. 2 is a horizontal sectional view of the same on the line $x\ x$ of Fig. 1. Fig. 3 is a vertical section through the wheel and boxes. Fig. 4 illustrates the several parts of the caster disconnected.

My invention relates to furniture-casters; and it consists in the peculiar construction and combination of devices which I shall hereinafter fully describe and claim.

To enable others skilled in the art to which my invention appertains to make and use the same, I will now describe its construction and indicate the manner in which the same is carried out.

In the drawings, A represents the wheel or roller; B, the fork; C, the stem passing through the fork and securing it to the wood of the furniture, and D the axle or shaft upon which the wheel or roller is mounted.

The fork B is provided at its lower ends with inwardly-turned flanges $a$, forming boxes E, within which the ends of the axle lie, and the front and rear walls of said boxes are formed with lugs $b$, which are arranged parallel with the sides of the fork and make the openings in the boxes practically T-shaped in cross-section, as shown in Fig. 2.

The axle D passes through the wheel or roller and is adapted to be fitted between the boxes, and said axle near each end and on opposite sides is formed with small grooves $c$, within which the inwardly-turned projections or lugs $b$ enter when the axle is in place, whereby said axle is prevented from rotating, but may be slipped into and removed from its seats in the boxes; or, if desired, the sides of the boxes may be pressed against the axle, whereby the latter is prevented from moving out of its seats therein. At the same time the boxes are prevented from crowding onto the wheel or roller, and also prevented from spreading apart.

From this description it will be seen that I am enabled to provide a cheap, simple, and substantial caster for furniture purposes and so arrange the parts that the roller may be connected and disconnected with the fork without difficulty.

Having thus described my invention, what I claim as new, and desire to secure by Letters Patent, is—

In a furniture-caster, the combination, with fork having the boxes E, the inner walls of which are formed with inwardly-turned lugs or projections, of an axle having its opposite sides grooved at points near the ends and adapted to be engaged by said lugs, and a wheel or roller mounted on the axle, substantially as herein described.

OLE PEDERSON.

Witnesses:
C. F. SMALLWOOD,
L. J. NIEHOFF.